United States Patent [19]

Miyashita

[11] Patent Number: 4,685,707
[45] Date of Patent: Aug. 11, 1987

[54] SUPERFINE FINISH PIPING JOINT

[75] Inventor: Naoya Miyashita, Yokohama, Japan

[73] Assignee: Sanko Kogyo Kabushiki Kaisha, Tokyo, Japan

[21] Appl. No.: 842,336

[22] Filed: Mar. 21, 1986

[30] Foreign Application Priority Data

Sep. 30, 1985 [JP] Japan .................................. 60-216326

[51] Int. Cl.$^4$ .............................................. F16L 25/00
[52] U.S. Cl. .................................... 285/328; 285/354; 285/917
[58] Field of Search ............... 285/353, 354, 386, 384, 285/379, 380, 277, 276, 917, 328

[56] References Cited

U.S. PATENT DOCUMENTS

| 939,908 | 11/1909 | Greenlaw | 285/386 X |
| 1,485,252 | 2/1924 | Denis | 285/276 X |
| 1,928,076 | 9/1933 | Rudolph | 285/353 X |
| 2,833,568 | 5/1958 | Corsette | 285/353 X |
| 3,058,761 | 10/1962 | Christophersen | 285/353 X |
| 3,262,722 | 7/1966 | Gastineau et al. | 285/379 X |
| 3,521,910 | 7/1970 | Callahan et al. | 285/353 X |

Primary Examiner—Dave W. Arola
Attorney, Agent, or Firm—Flynn, Thiel, Boutell & Tanis

[57] ABSTRACT

A superfine finish piping joint has a metal C ring disposed between a couple of joint pieces, the piping joints being capable of properly tightening the metal C ring for thereby being usuable for piping to a clean room. The superfine finish piping joint includes, besides a couple of the first and second joint pieces, a box nut, a thrust bearing disposed between a base portion of second joint piece facing to the internal end surface of an box nut, and a cup-shaped retainer serving to mount balls and rings, etc., of the thrust bearing as a whole on the second joint piece, etc., at prescribed positions.

9 Claims, 4 Drawing Figures

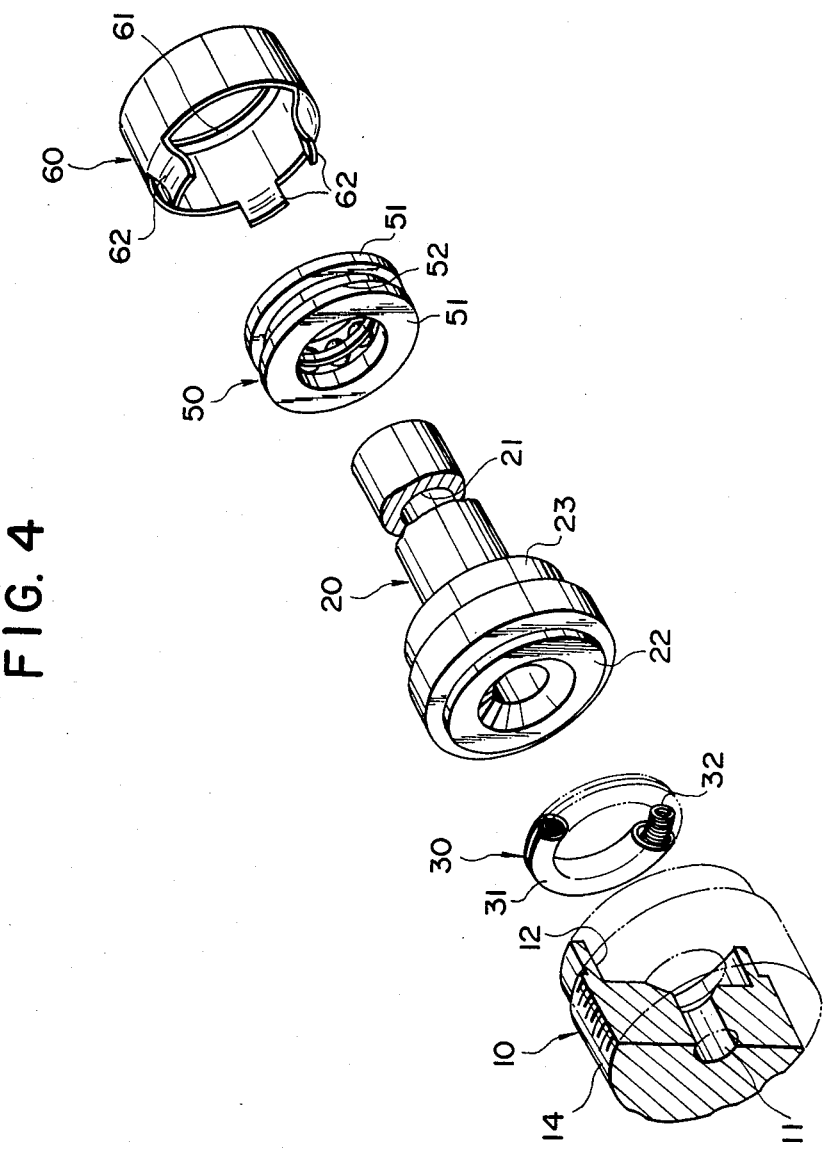

SUPERFINE FINISH PIPING JOINT

BACKGROUND OF THE INVENTION

1. Field of the Invention

The present invention relates to a piping joint, and more particularly to an ultrafine finish piping joint for use in piping, etc., leading to a clean room which requires cleanness.

2. Description of the Prior Art

In the semiconductor field, ICs and LSIs are treated in general in a clean room with fine particles and dust, etc., completely removed therefrom. Thus the treatment must be effected under very severe manufacturing environments and conditions. Such semiconductor manufacture needs specialty gas which is introduced from the outside of the clean room through piping. Accordingly, the manufacture dislikes to an extreme foreign gases such as air and the like mixed with the specialty gas, and requires ultrafine finish for the piping as well as for piping joints serving to connect the pipes with each other.

Hereupon, a prior piping joint of this type has a seal packing disposed between a couple of joint pieces, wherein a box nut is threaded into one of the joint pieces from the other thereof for clamping both joint pieces. In this case, the piping joint suffers from some drawbacks in that upon clamping the box nut by the rotation thereof the other joint piece is rotated together with the box nut so as to cause not only the seal packing to be twisted with a fear of the seal packing being broken but also to cause piping connected with the other joint piece to be twisted with a fear of damaging the piping itself. Hereupon, a metal C ring is often used for rendering help to the sealing. However, the metal C ring is deformed owing to the twisting and sharply deteriorated in its sealing property.

To solve such a problem, a structure is considered wherein the end surface of the other joint piece described above is adapted to support many balls which are then brought into contact with the internal end surface of the box nut to prevent the other joint piece from being twisted. However, both the other joint piece and the box nut have flat surfaces by which the balls are supported. Accordingly, the balls bite into these flat surfaces upon tightening them and form grooves therein or cause portions of the flat surfaces corresponding to the respective balls to be unevenly depressed. Thus, they can not exhibit proper torque for tightening, with a fear that the C ring might be twisted.

Furthermore, in piping and joints for use in a clean room, etc., in a semiconductor field, specialty gas flowing through the piping must be frequently exchanged. In this case, rough inner surfaces of the piping or an improper sealing structure of the joint not only makes a fluid path resistive but also causes gas molecules previously employed to reside on uneven portions of the surfaces of the piping or to go round the back side of the sealing portion of the joint. This old gas exudes out of the sealing portion and mixes in exchanged, newly introduced gas. This badly affects semiconductor products.

Thus, such a prior piping joint is improper for use in piping to a clean room.

Hereupon, the inventors conducted experimental work to assure proper sealing between both joint pieces, wherein instead of the use of the other joint piece for supporting the balls a thrust bearing comprising high hardness materials such as stainless steel was simply interposed between the other joint piece and the box nut to prevent the flat surface of the box nut from being deformed. However, the simple interposition of the thrust bearing did not necessarily enable the metal C ring to be tightened in place. The reason is not clear at present. It may be however inferred that rings and balls, etc., being members of the thrust bearing are slightly displaced or inclined upon tightening the box nut, and thereby torsional stress is produced between the other joint piece and the box nut, and thus some torsion is also provided between the joint pieces to permit the the metal C ring to be abnormally deformed.

Accordingly, a piping joint capable of properly tightening the boxnut while making the most of the sealing property of the metal C ring is desired.

SUMMARY OF THE INVENTION

It is an object of the present invention to provide a superfine finish piping joint having a metal C ring interposed between a couple of joint pieces, the piping joints being capable of properly tightening the metal C ring to thereby be useable for piping to a clean room.

To achieve the above object, the surperfine finish piping joint includes, first and second joint pieces, a box nut, a thrust bearing disposed between a base portion of the second joint piece facing to the internal end surface of the box nut and the internal end surface of the box nut, and a retainer serving to mount balls and rings, etc., being members of the thrust bearing integrally with the second joint pieces, etc., on prescribed positions thereof.

With the arrangement described above, the second joint thrust bearing is restricted in separate individual movements of respective components thereof and brought into contact with the second joint piece and the box nut in a parallel relation. In addition, keeping the above arrangement, the box nut can be tightened to prevent the twisting from being produced between the box nut and the second joint piece, i.e., between the first and second joint pieces.

Hereupon, the integral mounting of the respective components of the thrust bearing does not mean that they are completely fixed with respect to each other but means that quite free movements thereof are restricted. Namely, it is of course that the respective components of the thrust bearing movable independently with respect to each other serve function of a bearing as a whole.

The above and other objects, features and advantages of the present invention will become more apparent from the following description when taken in conjunction with the accompanying drawings in which a preferred embodiment of the present invention is shown by way of illustrative example.

DESCRIPTION OF THE DRAWINGS

FIG. 4 is an exploded view partially cut away and illustrating a portion of the embodiment shown in FIG. 1.

DESCRIPTION OF THE PREFERRED EMBODIMENT

An embodiment of a superfine finish piping joint according to the present invention will be described with reference to the accompanying drawings.

Figure 1:
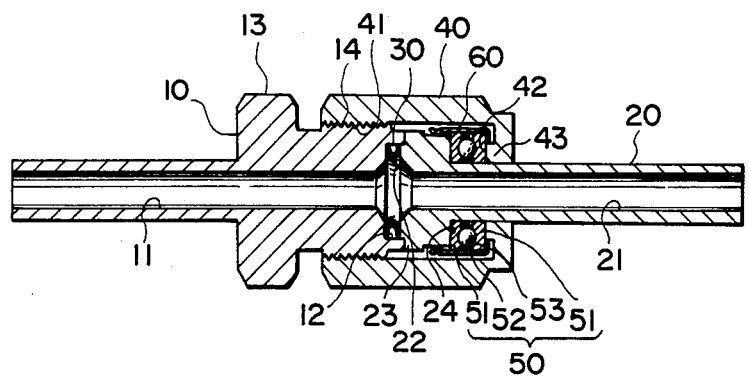
FIG. 1 is a cross sectional view illustrating an embodiment of a superfine finish piping joint according to the present invention.

Referring to FIG. 1 illustrating a general view of the embodiment, a female piece 10 which is a first joint piece and a male piece 20 which is a second joint piece respectively have respective penetration passages or holes 11, 21 ultrafine-finished in inner surface roughness and penetrating shaft cores thereof. End surfaces of these pieces 10, 20 facing to each other are respectively provided in a recess or concave portion 12 in the female piece and on a projection portion 22 provided on the side of the male piece 20 and engaged with the concave portion 12. A metal C ring 30 is interposed between the concave portion 12 and projection portion 22.

A hexagon flange 13 is provided integrally with the female piece 10 in the middle thereof while a screw part 14 is formed on the end outer periphery of the female piece 10. An inner periphery screw part 41 of a box nut 40 is threaded to the screw part 14 and the box nut 40 extends to cover a base portion 23 of the male piece 20 and cooperates with the male piece 20 so that the female piece 10 and the male piece 20 can be tightened.

A thrust bearing 50 is interposed between an end surface 24 of the base portion 23 of the male piece 20 and an inner end surface 42 of the box nut 40, more accurately the end surface of a projection 43 formed on the inner end surface 42. The thrust bearing 50, a conventional and commercially available thrust bearing, comprises a couple of disk-shaped rings 51, and balls 53 supported in a holder 52 inteposed between these rings 51, each ring 51 being made of high hardness stainless steel. In addition, the rings 51 and the balls 53, etc., being members of the thrust bearing 50 are held as a whole by a retainer 60 mounted on the base portion 23 of the female piece 20 which is the second joint piece.

Figure 2:
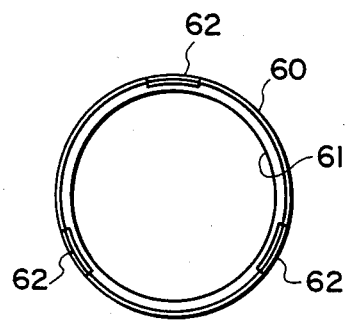
FIGS. 2 and 3 are respectively side elevational and cross sectional views illustrating an embodiment of a retainer for use in the present invention.
Figure 3:
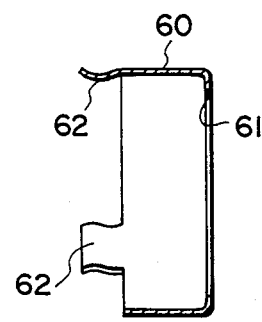

The retainer 60 is substantially cup-shaped as a whole as shown in FIGS. 2 and 3, and has a large diameter penetration hole 61 in the bottom thereof. The projection 43 of the box nut 40 is inserted into the penetration hole 61 and adapted to be capable of directly contacting with the end surface of the ring 51 of the thrust bearing 50. Therefore, the outer diameter of the projection 43 of the box nut 40 is made less than the inner one of the penetration hole 61. Moreover, tongue-shaped stop projecting pieces 62, each bent toward the side of the shaft core and further bent in their tips toward the outside are provided at three points spaced at an equal intervals of 120°. Each of these stop projecting pieces 62 is adapted to be springy and be securely stopped on the base portion 23 of the male piece 20. In addition, the retainer 60 is formed by subjecting a springy thin steel plate to drawing.

The metal C ring 30 described before comprises, as shown in FIG. 4, a hollow ring case 31 with the side of the outer peripheral edge thereof being opened and almost C-shaped in the end surface thereof, and a core member 32 produced by forming a wire into a ring, the wire being inserted into the ring case 31 and wound around a core material into a coil shape.

In assembling the parts of the piping joint with the arrangement described above, as shown in the exploded perspective view of FIG. 4, the thrust bearing 50 and the retainer 60 are located on the side of the shaft of the male piece 20, and the shaft of the male piece 20 is inserted into a bore of the thrust bearing 50. Hereupon, the thrust bearing 50 is covered with the retainer 60, and the stop projecting piece 62 of the retainer 60 is mounted on the outer periphery of the base portion 23 of the male piece 20. Hereby, the thrust bearing 50 is securely mounted on the male piece 20, and an end surface of the ring 51 of the thrust bearing 50 is brought into contact with the end surfce 24 of the base portion 23 of the male piece 20 without inclination, etc., thereof.

Successively, the metal C ring 30 is put between the projection 22 of the male piece 20 and the concave portion 12 of the female piece 10 in a sandwiching relation, and, with the box nut 40 inserted from the side of the male piece 20 which is the second joint piece, the screw part 41 of the box nut 40 is screwed into the screw part 14 of the female piece 10 which is the first joint piece. Rotation of the box nut 40 effected in screwing the screw part 14 thereof is completely absorbed through the thrust bearing 50 and thus no rotating force is transmitted to the male piece 20. Hereby, the female and male pieces 10 and 20, being respectively the first and second joint pieces are tightened without relative rotation therebetween, and thereby the metal C ring 30 interposed between the concave portion 12 and the projection 22 is tightened, without torsional force being applied thereto, for proper sealing. Hereupon, since the thrust bearing 50 is held by the retainer 60, the female and male pieces 10 and 20 are tightened by the box nut 40 keeping a parallel position therebetween without causing any inclination.

According to the present embodiment, as described above, the thrust bearing 50 is interposed between the male piece 20 which is the second joint piece and the internal end surface 42 of the box nut 40, while the thrust bearing 50 is mounted by the retainer 60 at a prescribed position, namely on the base portion 23 of the male piece 20 in the present embodiment. Accordingly, the components of the thrust bearing 50 such as the rings 51 and balls 53, etc., are pressed onto the base portion 23 of the male piece 20 in a manner keeping a parallel position thereamong. Meanwhile, since no torsional force, etc., is produced between the box nut 40 and the male piece 20, no torsional force is produced between the female piece 10 which is the first joint piece and the male piece 20 which is the second joint piece. Thus, no twisting, etc., is exerted on the metal C ring 30 interposed between the female and male pieces 10 and 20, to enable a sealing function of the metal C ring 30 to be securely manifested without a fear that any gas goes round the outer periphery, etc., of the metal C ring 30 and resides there. In addition, since in tightening the female and male pieces 10 and 20 with the box nut 40, there is no fear of twisting them, and no fear that any piping, etc., connected with these pieces 10 and 20 will be deformed, no gas stays in the piping in this case. Moreover, since the thrust bearing 50 having respective components provided separately therein is covered with the box nut 40 in a state wherein it is mounted on the male piece 20 by the retainer 60, their assembly can be effected with ease. Furthermore, since the end surface of the projection 43 of the box nut 40 directly makes contact with the end surface of the ring 51 of the thrust bearing 50, more smooth rotation of the box nut 40 can be assured without a fear of transmission of torsional force to the male piece 20, etc. In addition, the inner surfaces of the penetration holes 11, 21 made in the female and male pieces 10, 20 are subjected to superfine finish without a fear that the surface roughness acts resistively against the gas flowing through the penetration hole and causes pressure loss of the flow path. There is furthermore no possibility that the gas enters uneven portions formed due to the surface roughness and stays there, and that the old remaining gas mixes in the next different gases to thereby deteriotate qualities of semiconductor products. Accordingly, a piping joint according to the present embodiment can also be employed for piping inside and outside the clean room. Moreover, for the thrust bearing 50, a commercial one can be profitably employed. The retainer 60 for holding the thrust bearing 50 can be manufactured with very simple processing such as press, etc. So, the whole of the piping joint can be provided at a low cost as well as the effect thereof being made very conspicuous.

In addition, although in the embodiment described above a position to mount the retainer 60 was described to be the base portion 23 of the male piece 20, the present invention is not limited thereto. For example, the retainer 60 and the nut 40 are respectively properly shaped whereby the thrust bearing 50 may be mounted on the side of the box nut 40. Furthermore, with the stop projecting piece 62 of the retainer 60 lengthened, the retainer 60 may be mounted on the female piece 10 side. In short, the present invention can be satisfied provided that the respective components of the thrust bearing 50 are mounted as a whole at the prescribed positions by the retainer 60. If the thurst bearing 50 is mounted on the male piece 20, assembling thereof is advantageously facilitated. Moreover, although in the above embodiment the female piece 10 and the male piece 20 are respectively described as the first joint piece and second joint piece, the present invention is not limited thereto. Namely, the female piece 10 may be assumed to be the second joint piece while the male piece 20 the first joint piece. This modification is made possible by changing shapes of portions of both the pieces 10, 20 for holding the metal C ring 30. Accordingly, those designations are not essential. In addition, the shape of the retainer 60 is not limited to that of the above embodiment, namely another shape may be allowed. Although it is after all essential that the thrust bearing 50 can be held by the retainer 60, the arrangement described above is advantageous in view of manufacturing the piping joint at a low cost. Furthermore, although the smoother the roughness of the inner surfaces of the penetration holes 11, 21 of both the pieces 10, 20 the better, it is sufficient if they are processed within superfine finish from the view point of the processing cost.

According to the present invention, as described above, it is possible to provide a superfine finish piping joint wherein the metal C ring can be properly tightened, said superfine finish piping joint being applicable to piping under severe conddditions such for example as a clean room. Although a certain preferred embodiment has been shown and described, it should be understood that many changes and modifications may be made therein wthout departing from the scope of the appended claims.

What is claimed is:

1. A piping joint, comprising:
   a first joint piece having threads thereon, having a first surface thereon which faces in a first direction, and having therein a first passage which opens through said first surface;
   a second joint piece having thereon a second surface which faces in a second direction opposite said first direction and faces said first surface on said first joint piece, said second joint piece having therein a second passage which opens through said second surface and having thereon a third surface which faces in said first direction;
   a ring which is interposed between said first and second joint pieces and has a central opening therethrough, said first and second surfaces on said joint pieces sealingly engaging said ring on opposite sides thereof, and said first and second passages being in fluid communication with each other through said central opening in said ring;
   a box nut rotatable relative to said first and second joint pieces and having threads thereon which engage said threads on said first joint piece, said box nut having thereon a fourth surface which faces in said second direction and faces said third surface on said second joint piece;
   a thrust bearing interposed between said third surface on said second joint piece and said fourth surface on said box nut; and
   a retainer member having means for supporting said retainer member on one of said second joint piece and said box nut and which supports said thrust bearing in a predetermined position on said one of said second joint piece and said box nut;
   wherein rotation of said box nut relative to said joint pieces in a predetermined direction effects movement of said box nut in said second direction relative to said first joint piece, said box nut effecting movement of said thrust bearing and said second joint piece in said second direction so as to effect movement of said first and second surfaces toward each other and into progressively tighter sealing engagement with the opposite sides of said ring.

2. The piping joint according to claim 1, wherein said means on said retainer member supports said retainer member and said thrust bearing on said second joint piece.

3. The piping joint according to claim 2, wherein said retainer member is substantially cup-shaped and has in a bottom wall thereof a large diameter penetration hole, and wherein said box nut has thereon a projection which has a diameter less than that of and extends in said second direction through said penetration hole in said retainer member, said projection having thereon said fourth surface which engages said thrust bearing.

4. The piping joint according to claim 3, wherein said retainer member is made of a thin plate material which has been drawn into said cup shape, and wherein said means on said retainer member includes a plurality of integral, springy, tongue-shaped stop pieces projecting outwardly therefrom in said second direction from an end thereof remote from said bottom wall, said stop pieces engaging respective surface portions provided on said second joint piece in order to releasably hold said retainer member on said second joint piece.

5. The piping joint according to claim 1, wherein surfaces in said first and second passages in said first and second joint pieces are finished so as to be extremely smooth.

6. The piping joint according to claim 1, wherein said ring is made of a metal material and is C-shaped in cross-section, and wherein said thrust bearing includes two annular rings having a plurality of angularly spaced balls therebetween.

7. The piping joint according to claim 1, wherein said first joint piece has a recess therein of cylindrical shape, said first surface being located at an inner end of said recess, and wherein said second joint piece has thereon a cylindrical projection which has a diameter slightly less than the diameter of said cylindrical recess in said first joint piece and which has at an outer end thereof said second surface, said ring being disposed in said recess and having a diameter slightly less than that of said recess, and said projection on said second joint piece extending into said recess.

8. The piping joint according to claim 4, wherein said second joint piece has thereon a radially outwardly facing cylindrical surface at a location between said second and third surfaces thereon, said surface portions on said second joint piece being respective sections of said cylindrical surface, wherein said tongue-shaped stop pieces on said retainer member are urged against said cylindrical surface portion on said second joint piece by inherent resilience thereof so as to frictionally grip said cylindrical surface and thereby releasably hold said retainer member on said second joint piece; wherein said second joint piece has a cylindrical shaft portion which is coaxial with and of lesser diameter than said cylindrical surface and which projects outwardly in said first direction from said third surface and extends through said penetration hole in said retainer and through an opening in said projection on said box nut, said second passage extending through said cylindrical shaft portion lengthwise thereof; and wherein said third and fourth surfaces and said thrust bearing are annular and encircle said cylindrical shaft portion of said second joint piece.

9. The piping joint according to claim 1, wherein said ring is hollow and has a circumferentially extending slit in its outer peripheral edge, and including within said ring an annular core and a wire wound spirally around said annular core.

* * * * *